Patented June 4, 1940

2,203,196

UNITED STATES PATENT OFFICE 2,203,196

POLYAZO DYESTUFFS AND PROCESS OF MAKING SAME

Walter Hanhart, Riehen, Switzerland, assignor to the firm Society of Chemical Industry in Basle, Basel, Switzerland No Drawing. Application June 15, 1937, Serial No. 148,414. In Switzerland June 17, 1936

9 Claims. (Cl. 260—143)

It has been found that polyazo dyestuffs containing metal in complex union of the general formula

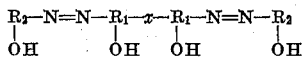

wherein $x$ stands for $-N=N-$ or

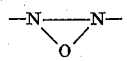

the two $R_1$'s represent benzene radicals of which the hydroxyl-groups stand in ortho-position to the two azo-groups, wherein further $x$ stands in para-position to the two azo-groups, and the two $R_2$'s represent radicals of coupling components of which the hydroxyl-groups stand in ortho-position to the azo-groups, can be produced if monoazo dyestuffs of the general formula

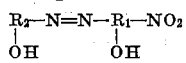

wherein $R_1$ and $R_2$ have the signification indicated above, the hydroxyl groups of the radicals $R_1$ and $R_2$ stand in ortho-position to the azo-group, and wherein the nitro-group stands in para-position to the azo-group, are heated in an alkaline medium with reducing agents in such a manner that the nitro-group is converted into such a reduction stage which links two radicals of the monoazo dyestuff by $-N=N-$ or

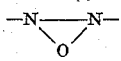

and if the polyazo dyestuffs thus formed are caused to react with agents yielding metal.

The monoazo dyestuffs suitable as parent materials for the invention are obtainable, for example, by coupling diazotized 5-nitro-2-amino-1-phenols which may contain substituents, for instance sulfo-groups, halogens, alkyl groups or alkoxy groups, with one of the various coupling components, for instance hydroxy-naphthalenes, for example 1-hydroxynaphthalenes and their sulfonic acids, and phenols, or substances whose coupling carbon atom belongs to an open chain or a heterocyclic ring. Especially suitable coupling components are the amino-hydroxynaphthalene sulfonic acids, particularly those which are derived from 1-hydroxynaphthalenes.

As reducing agents which may be used in alkaline medium, for example caustic soda solution or caustic potash solution, are, for instance, glucose, alkali sulfides or a stannite.

The dyestuffs obtainable by the invention are useful for dyeing and printing various materials; they are suitable for dyeing vegetable fibres such as cotton, artificial silk from regenerated cellulose. The dyeings obtained by after-treatment with metal compounds, for example copper salts, which may be conducted in the usual manner or by the process of application Serial No. 116,038, filed December 15, 1936, are very fast.

Very valuable dyestuffs are also obtained if the dyestuff obtained by reduction is treated in the usual manner with an agent yielding metal, for instance chromium, nickel or copper, in an open vessel or under pressure.

In many cases it is of advantage if the metallising operation is conducted in the presence of an organic compound containing a hydroxyl group which can form with the agent yielding metal, particularly an agent yielding copper, a compound stable towards dilute alkalies. Such compounds containing hydroxyl are, for example, aliphatic carboxylic acids (for instance lactic acid, tartaric acid, glycollic acid, tartronic acid, malic acid, dioxy-tartaric acid, citric acid, saccharic acid, gluconic acid, heptonic acid) or alcohols (for instance glycerol and glycol) or derivatives of ammonia containing hydroxyl (for instance methanolamine and ethanolamine). A like good effect is obtainable by working with aliphatic amino-carboxylic acids, for instance aminoacetic acid.

Instead of conducting the reduction of the azo dyestuff and its conversion into the complex metallic compound in the two-stage process it is also possible to use directly for the metallization the dyestuff solution as it is obtained by the reduction of the dyestuff.

Metal compounds of the dyestuffs are especially suitable for dyeing and printing vegetable fibre. They yield very various fast tints.

The following examples illustrate the invention, the parts being by weight:

Example 1

The diazo-compound from 2.2 parts of 5-nitro-2-amino-1-hydroxybenzene is coupled in the usual manner in an alkaline solution with 3.6 parts of 2-amino-5-hydroxynaphthalene-7-sulfonic acid and the precipitated dyestuff, washed with common salt solution, is dissolved in 300 parts of water with addition of 26.5 parts of caustic soda solution of 30 per cent. strength. After heating to 60° C. 1.5 parts of grape sugar in the form of a solution of 10 per cent. strength is added and the temperature is kept at that named for about ¼ hour. A sample of the dyestuff dissolves in concentrated sulfuric acid to a blue solution, whereas the parent dyestuff dissolves similarly to a bluish red solution. The whole is neutralized with dilute acid and the dyestuff of the formula

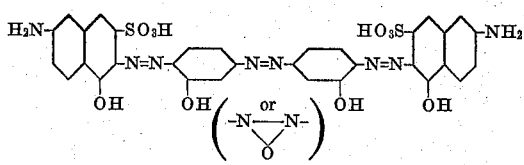

is salted out. In dry condition it is a dark powder soluble in water to a blue-violet solution and in concentrated sulfuric acid to a dirty blue solution; it dyes cotton in a bath containing Glauber's salt blue violet tints which by after-treatment with a copper salt become a blue fast to washing and light.

If the corresponding dyestuff from 2-benzoyl-amino-5-hydroxynaphthalene-7-sulfonic acid is used and reduced in the manner given in the last preceding paragraph there is obtained by after-coppering on the fibre a fast greenish grey tint.

Example 2

The alkaline solution of the dyestuff obtained at the conclusion of the reduction described in Example 1 is mixed with a solution made from 2.5 parts of crystallized copper sulfate, 3 parts of tartaric acid, 50 parts of water and the quantity of caustic soda solution necessary for neutralization. By stirring and heating for a short time the reaction is finished, whereupon the mass is neutralized and the dyestuff salted out. The

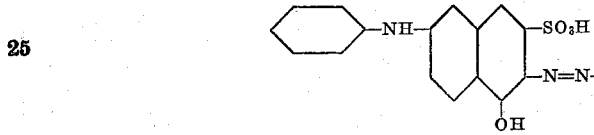

copper compound thus obtained is, when dry, a dark powder soluble in dilute sodium carbonate solution to a reddish blue solution and in concentrated sulfuric acid to a dirty blue solution. It dyes cotton and artificial silk from regenerated cellulose greenish blue tints very fast to light in a bath containing Glauber's salt.

Example 3

1.9 parts of 5-nitro-2-amino-1-hydroxybenzene are diazotized and coupled in the usual manner with 4.2 parts of 1-amino-8-hydroxynaphthalene-3:6-disulfonic acid in alkaline solution. The dyestuff obtained may be purified by washing with salt solution; it is dissolved in 500 parts of water with the aid of 33 parts of caustic soda solution of 30 per cent. strength and the solution is mixed at about 60° C. with 2 parts of grape sugar in the form of a solution of 10 per cent. strength. The whole is stirred for about 1 hour

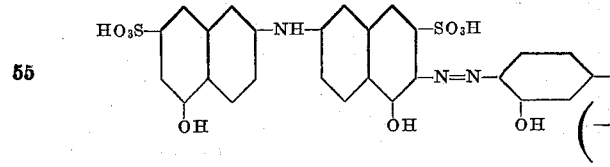

at the same temperature, then neutralized and the dyestuff of the formula

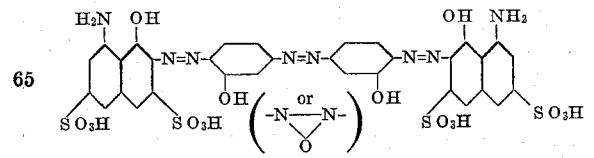

salted out.

By heating the aqueous solution of the dyestuff with copper sulfate the dyestuff may be converted into its copper compound. In dry condition it is a dark powder soluble in water to a blue solution and in concentrated sulfuric acid to a violet solution and dyeing cotton in a bath containing Glauber's salt pure greenish blue tints.

For the purpose of obtaining the copper compound it is not necessary to separate the dyestuff; it can be metallized by any known method directly following the reduction.

Example 4

The dyestuff obtained by coupling the diazo-compound from 1.54 parts of 5-nitro-2-amino-1-hydroxybenzene and 3.3 parts of 2-phenylamino-5-hydroxynaphthalene-7-sulfonic acid is separated and dissolved in 100 parts of water containing 10.5 parts of caustic soda solution of 30 per cent. strength. At 60° C. there is added a solution of 1.5 parts of grape sugar in 15 parts of water and the whole is stirred for about an hour at the said temperature. On cooling a part of the dyestuff separates; the precipitation is completed by adding some common salt and neutralizing with dilute acetic acid or mineral acid. The dry dyestuff of the formula

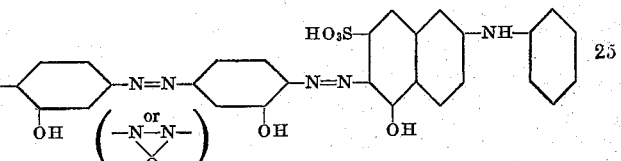

is a powder of bronze appearance soluble in dilute sodium carbonate solution and in concentrated sulfuric acid to blue solutions and dyeing cotton in a bath containing Glauber's salt reddish blue tints which become a fast greenish blue when coppered.

Example 5

The dyestuff obtained by coupling the diazo-compound from 1.54 parts of 5-nitro-2-amino-1-hydroxybenzene and 4.8 parts of 5:5'-dioxy-2:2'-dinaphthylamine-7:7'-disulfonic acid is separated and washed with common salt solution and then dissolved in 300 parts of water at 60° C. with addition of 20 parts of caustic soda solution of 30 per cent. strength. There is then added a solution of 10 per cent. strength containing 1.8 parts of grape sugar and the whole is stirred for about an hour at 60° C. Dilute mineral acid is now added until the solution is only slightly alkaline and the dyestuff of the formula

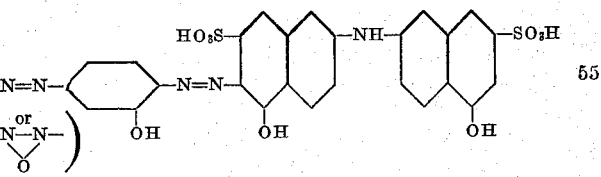

is salted out. When dry it is a powder of metallic lustre soluble in water and concentrated sulfuric acid to blue-violet solutions; it dyes cotton in a bath containing Glauber's salt reddish blue tints which by after-coppering become fast greenish grey.

The dyestuff may also be converted into its copper compound in substance either by metallizing in sequence to the reduction or only after subsequent separation.

Example 6

2.6 parts of 5-nitro-2-amino-1-hydroxybenzene are diazotized and coupled in alkaline solution with 4.2 parts of 1-amino-8-hydroxynaphthalene-4-sulfonic acid. The filtered and washed dyestuff is dissolved in 80 parts of water at 60 C. with the aid of 11.3 parts of caustic soda solution of 30 per cent. strength. There are then added 1.5 parts of grape sugar in the form of a solution of 10 per cent. strength and the whole is stirred for about 1 hour at 60° C. After neutralization with dilute acid some common salt is added and the dyestuff of the formula

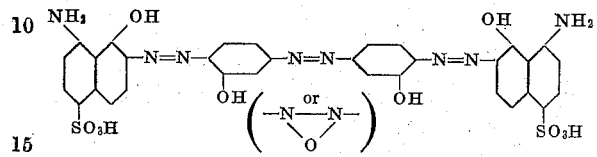

is filtered. When dry it is a dark powder soluble in water to a blue solution and in concentrated sulfuric acid to a blue-violet solution; it dyes cotton in a bath containing Glauber's salt grey

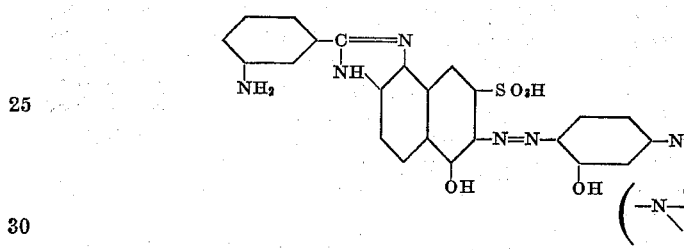

tints which by after-treatment with copper salts pass to very fast greenish grey.

*Example 7*

1.54 parts of 5-nitro-2-amino-1-hydroxybenzene are diazotized and coupled with 2.3 parts of 1-hydroxynaphthalene-4-sulfonic acid. The dyestuff thus obtained is separated and dissolved in 250 parts of water at 60° C. with addition of 20 parts of caustic soda solution of 30 per cent. strength; there are then added 1.5 parts of grape sugar in the form of a solution of 10 per cent. strength and stirring is continued for about 1 hour. The reduced dyestuff of the formula

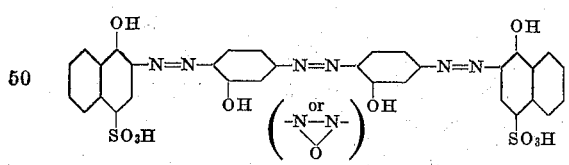

is thus precipitated in part; neutralization and

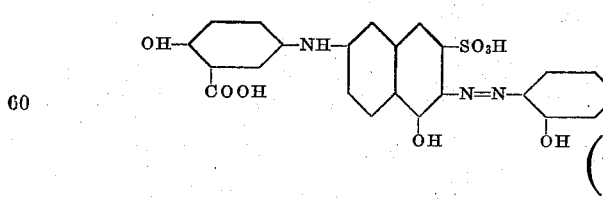

salting out produce a complete precipitation. The dry dyestuff is a dark powder soluble in water and in concentrated sulfuric acid to blue-violet solutions; it dyes cotton in a bath containing Glauber's salt blue-green tints which by after-treatment with copper sulfate become fast grey.

*Example 8*

1.7 parts of 5-nitro-2-amino-1-hydroxybenzene are diazotized and coupled in the usual manner with 4.1 parts of the imidazole of the formula

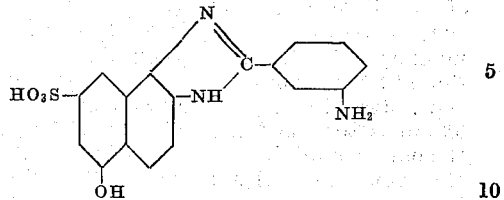

The separated dyestuff is dissolved in 80 parts of water at 60° C. with the aid of 11.3 parts of caustic soda solution of 30 per cent. strength. A solution of 10 per cent. strength of 1.6 parts of grape sugar is added and the whole is stirred for about an hour at 55–60 C. By adjusting the reaction of the mass to weak alkalinity by addition of acid and adding common salt the dyestuff of the formula

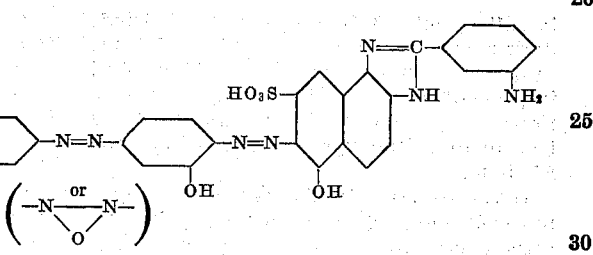

is precipitated; for the purpose of purifying it it may be precipitated once more. When dry it is a dark powder soluble in dilute sodium carbonate solution and in concentrated sulfuric acid to blue solutions and dyeing cotton in a bath containing Glauber's salt blue-grey tints which become a fast green-blue when after-coppered.

*Example 9*

1.7 parts of 5-nitro-2-amino-1-hydroxybenzene are diazotized and coupled in a solution alkaline with sodium carbonate with 4.4 parts of 2-(4'-hydroxy-3'-carboxyphenylamino)-5-hydroxy-naphthalene-7-sulfonic acid. The azo dyestuff thus obtained is salted out, filtered, and washed with common salt solution. It is then dissolved by addition of 24 parts of caustic soda solution of 30 per cent. strength in 250 parts of water and heated to 55–60° C. At this temperature there are added 1.8 parts of grape sugar in the form of a solution of 10 per cent. strength and the whole is stirred for about 30–45 minutes. The solution is then weakly acidified with acetic acid and the dyestuff of the formula

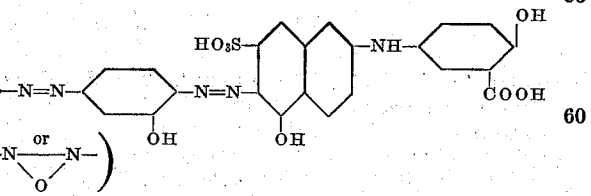

precipitated by addition of common salt. When filtered and dried it is a dark powder soluble in water to a violet solution, in dilute sodium carbonate to a blue solution and in concentrated sulfuric acid to a blue-violet solution; it dyes cotton in a bath containing Glauber's salt blue tints which by after-treatment with copper salts pass to a fast greenish blue.

*Example 10*

The dyestuff obtained by coupling in alkaline solution the diazo compound from 1.8 parts of 5-nitro-2-amino-1-hydroxybenzene and 4.4 parts of 2-(3'-carboxyphenylamino)-5-hydroxynaphthalene-7-sulfonic acid is separated in known manner and filtered and then dissolved by addition of 24 parts of caustic soda solution of 30 per cent. strength in 250 parts of water of 60° C. There is then added a solution of 10 per cent. strength containing 1.8 parts of grape sugar and the whole is stirred for 20-30 minutes at 55-60° C. Acetic acid is then added until the solution is only slightly alkaline and the dyestuff of the formula

[Structural formula: benzene ring with COOH, -NH- linked to naphthalene bearing SO₃H and OH, -N=N- to benzene with OH, -N=N- (or -N-N- with O bridge) to further benzene-naphthalene-benzene system]

is salted out. When filtered and dried it is a dark powder soluble in water to a violet solution, in dilute sodium carbonate to a blue solution and in concentrated sulfuric acid to a blue-violet solution; it dyes cotton blue tints which by after-treatment with copper salts pass to a fast greenish blue.

If the dyestuff is dissolved in a caustic alkaline solution and salted out, there is obtained by after-coppering a somewhat purer, greener dyeing.

*Example 11*

1.54 parts of 5-nitro-2-amino-1-hydroxybenzene are diazotized and coupled in usual manner in alkaline solution with 3.6 parts of 2-(2'-methoxyphenylamino)-5-hydroxynaphthalene-7-sulfonic acid. After coupling is complete the dyestuff has completely precipitated; it is then filtered, washed with common salt solution of 10 per cent. strength and dissolved by addition of 24 parts of caustic soda solution of 30 per cent. strength in 250 parts of water at 60° C. 1.5 parts of grape sugar in the form of a solution of 10 per cent. strength are then added and the whole is stirred for ½ hour at 55–60° C. The main quantity of the lye is neutralized with acetic acid until the solution shows only a weakly alkaline reaction, some common salt is then added and the dyestuff of the formula

[Structural formula: benzene with OCH₃, -NH- to naphthalene with SO₃H and OH, -N=N- to benzene with OH, -N=N- (or -N-N- with O bridge) continuing through further aromatic rings with OCH₃]

which has precipitated is filtered. The dry dyestuff is a dark powder, soluble in dilute sodium carbonate solution and in concentrated sulfuric acid to blue solutions; it dyes cotton in a bath containing Glauber's salt reddish blue tints which by after-treatment with copper salts pass to a fast blue.

What I claim is:

1. Process for the manufacture of polyazo dyestuffs of the general formula $$R_2-N=N-R_1-x-R_1-N=N-R_2$$
$$\underset{OH}{|}\quad\underset{OH}{|}\quad\underset{OH}{|}\quad\underset{OH}{|}$$

wherein $x$ is a member of the group consisting of $$-N=N-\quad\text{and}\quad -N\underset{O}{\diagdown\diagup}N-$$

the two $R_1$'s represent benzene radicals of which the hydroxyl-groups stand in ortho-position to the two azo-groups, wherein further $x$ stands in para-position to the two azo-groups and the two $R_2$'s represent radicals of coupling components of which the hydroxyl-groups stand in ortho-position to the azo-groups, consisting in heating in an alkaline medium monoazo dyestuffs of the general formula $$R_2-N=N-R_1-NO_2$$
$$\underset{OH}{|}\quad\underset{OH}{|}$$

wherein $R_1$ and $R_2$ have the signification indicated above, the two hydroxyl groups of the radicals $R_1$ and $R_2$ stand in ortho-position to the azo-group, and wherein the nitro-group stands in para-position to the azo-group, with reducing agents in such a manner that the nitro-group is converted into such a reduction stage which links the two radicals of the monoazo-dyestuff by a member of the group consisting of $$-N=N-\quad\text{and}\quad -N\underset{O}{\diagdown\diagup}N-$$

2. Process for the manufacture of polyazo dyestuffs of the general formula $$R_2-N=N-R_1-x-R_1-N=N-R_2$$
$$\underset{OH}{|}\quad\underset{OH}{|}\quad\underset{OH}{|}\quad\underset{OH}{|}$$

wherein $x$ is a member of the group consisting of $$-N=N-\quad\text{and}\quad -N\underset{O}{\diagdown\diagup}N-$$

the two $R_1$'s represent benzene radicals of which the hydroxyl-groups stand in ortho-position to the two azo-groups, wherein further $x$ stands in para-position to the two azo-groups and the two $R_2$'s represent naphthalene radicals of which the hydroxyl-groups stand in ortho-position to the azo-groups, consisting in heating in an alkaline medium monoazo dyestuffs of the general formula $$R_2-N=N-R_1-NO_2$$
$$\underset{OH}{|}\quad\underset{OH}{|}$$

wherein $R_1$ and $R_2$ have the signification indicated above, the two hydroxyl-groups of the radicals $R_1$ and $R_2$ stand in ortho-position to the azo-group, and wherein the nitro-group stands in para-position to the azo-group, with reducing agents in such a manner that the nitro-group is converted into such a reduction stage which links the two radicals of the monoazo dyestuff by a member of the group consisting of $$-N=N-\quad\text{and}\quad -N\underset{O}{\diagdown\diagup}N-$$

3. Process for the manufacture of polyazo dyestuffs of the general formula $$R_2-N=N-R_1-x-R_1-N=N-R_2$$
$$\underset{OH}{|}\quad\underset{OH}{|}\quad\underset{OH}{|}\quad\underset{OH}{|}$$

wherein $x$ is a member of the group consisting of —N=N— and

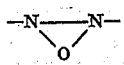

the two $R_1$'s represent benzene radicals of which the hydroxyl-groups stand in ortho-position to the two azo-groups, wherein further $x$ stands in para-position to the two azo-groups and the two $R_2$'s represent naphthalene radicals of which the hydroxyl-groups stand in ortho-position to the azo-groups, consisting in heating in an alkaline medium monoazo dyestuffs of the general formula

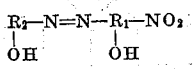

wherein $R_1$ and $R_2$ have the signification indicated above, the two hydroxyl-groups of the radicals $R_1$ and $R_2$ stand in ortho-position to the azo-group, and wherein the nitro-group stands in para-position to the azo-group, with grape sugar in such a manner that the nitro-group is converted into such a reduction stage which links the two radicals of the monoazo dyestuff by a member of the group consisting of —N=N— and

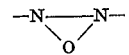

4. Process for the manufacture of polyazo dyestuffs of the general formula

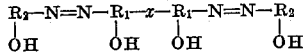

wherein $x$ is a member of the group consisting of —N=N— and

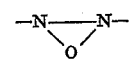

the two $R_1$'s represent benzene radicals of which the hydroxyl-groups stand in ortho-position to the two azo-groups, wherein further $x$ stands in para-position to the two azo-groups and the two $R_2$'s represent naphthalene radicals which are linked in a 2-position with the azo-groups and of which the hydroxyl-groups stand in ortho-position to the azo-groups, consisting in heating in an alkaline medium monoazo dyestuffs of the general formula

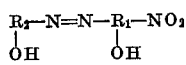

wherein $R_1$ and $R_2$ have the signification indicated above, the two hydroxyl groups of the radicals $R_1$ and $R_2$ stand in ortho-position to the azo-group and the naphthalene radical $R_2$ is linked in a 2-position with the azo-group, and wherein the nitro-group stands in para-position to the azo-group, with reducing agents in such a manner that the nitro-group is converted into such a reduction stage which links the two radicals of the monoazo dyestuff by a member of the group consisting of —N=N— and

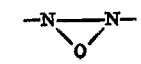

5. Process for the manufacture of polyazo dyestuffs of the general formula

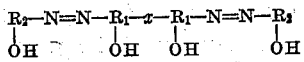

wherein $x$ is a member of the group consisting of —N=N— and

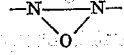

the two $R_1$'s represent benzene radicals of which the hydroxyl-groups stand in ortho-position to the two azo-groups, wherein further $x$ stands in para-position to the two azo-groups and the two $R_2$'s represent naphthalene radicals which are linked in a 2-position with the azo-groups and of which the hydroxyl-groups stand in ortho-position to the azo-groups, consisting in heating in an alkaline medium monoazo dyestuffs of the general formula

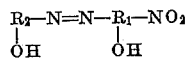

wherein $R_1$ and $R_2$ have the signification indicated above, the two hydroxyl groups of the radicals $R_1$ and $R_2$ stand in ortho-position to the azo-group and the naphthalene radical $R_2$ is linked in a 2-position with the azo-group, and wherein the nitro-group stands in para-position to the azo-group, with grape sugar in such a manner that the nitro-group is converted into such a reduction stage which links the two radicals of the monoazo dyestuff by a member of the group consisting of —N=N— and

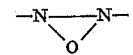

6. Azo dyestuffs of the general formula

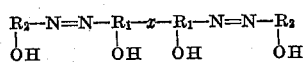

wherein $x$ is a member of the group consisting of —N=N— and

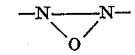

the two $R_1$'s represent benzene radicals of which the hydroxyl-groups stand in ortho-position to the two azo-groups, wherein further $x$ stands in para-position to the two azo-groups and the two $R_2$'s represent radicals of coupling components of which the hydroxyl-groups stand in ortho-position to the azo-groups.

7. Azo dyestuffs of the general formula

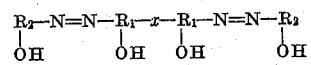

wherein $x$ is a member of the group consisting of —N=N— and

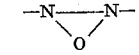

the two $R_1$'s represent benzene radicals of which the hydroxyl-groups stand in ortho-position to the two azo-groups, wherein further $x$ stands in para-position to the two azo-groups and the two $R_2$'s represent naphthalene radicals of which the hydroxyl-groups stand in ortho-position to the azo-groups.

8. Azo dyestuffs of the general formula

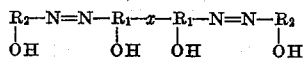

wherein $x$ is a member of the group consisting of —N=N— and

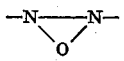

the two $R_1$'s represent benzene radicals of which the hydroxyl-groups stand in ortho-position to the two azo-groups, wherein further $x$ stands in para-position to the two azo-groups and the two $R_2$'s represent naphthalene radicals of which the hydroxyl-groups stand in a 1-position and in ortho-position to the azo-groups.

9. Azo dyestuffs of the formula

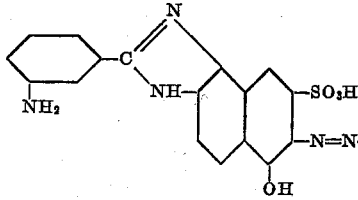 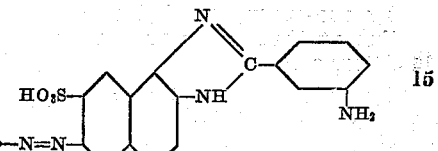

wherein $x$ stands for a member of the group consisting of —N=N— and

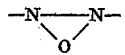

WALTER HANHART.